(12) United States Patent
Tang

(10) Patent No.: US 10,979,230 B1
(45) Date of Patent: Apr. 13, 2021

(54) BLOCK CHAIN PROOF FOR IDENTIFICATION

(71) Applicant: DRFIRST.COM, INC., Rockville, MD (US)

(72) Inventor: Zilong Tang, Rockville, MD (US)

(73) Assignee: DrFirst.com, Inc., Rockville, MD (US)

( * ) Notice: Subject to any disclaimer, the term of this patent is extended or adjusted under 35 U.S.C. 154(b) by 0 days.

(21) Appl. No.: 17/247,110

(22) Filed: Nov. 30, 2020

Related U.S. Application Data

(60) Provisional application No. 62/988,271, filed on Mar. 11, 2020.

(51) Int. Cl.
*H04L 29/06* (2006.01)
*H04L 9/32* (2006.01)

(52) U.S. Cl.
CPC .......... *H04L 9/3236* (2013.01); *H04L 9/3231* (2013.01); *H04L 2209/38* (2013.01)

(58) Field of Classification Search
CPC .. H04L 9/3236; H04L 9/3231; H04L 2209/38
USPC ....................................................... 713/168
See application file for complete search history.

(56) References Cited

U.S. PATENT DOCUMENTS

| | | | | |
|---|---|---|---|---|
| 2017/0352033 | A1* | 12/2017 | Buckman | ................ H04L 9/321 |
| 2018/0068173 | A1* | 3/2018 | Kolleri | .................... G06F 16/29 |
| 2018/0316665 | A1* | 11/2018 | Caldera | ................... H04L 63/08 |
| 2019/0303541 | A1* | 10/2019 | Reddy | .................. H04L 9/0643 |

* cited by examiner

*Primary Examiner* — Evans Desrosiers
(74) *Attorney, Agent, or Firm* — Brake Hughes Bellermann LLP

(57) ABSTRACT

Implementations efficiently verify an identity claim for an entity. An example method includes receiving a query key and a property identifying an entity and identifying a possible match for the property from graph access records, the possible match being a node in an identity chain. The method also includes verifying a complete chain from the possible match to a genesis node in the chain. The query key is used to find a next node in the chain. Failure to identify the genesis node results in an unsuccessful verification. The method also includes generating a response that indicates a successful verification request responsive to locating the genesis node and generating a response that indicates an unsuccessful verification request otherwise.

23 Claims, 5 Drawing Sheets

… … …

BLOCK CHAIN PROOF FOR IDENTIFICATION

RELATED APPLICATION

The application is a non-provisional of, and claims priority to, U.S. Provisional Application No. 62/988,271, filed Mar. 11, 2020, which is incorporated herein by reference in its entirety.

TECHNICAL FIELD

The present teaching relates to methods, systems and programming for identity verification using nodes in a graph. Particularly, the present teaching is directed to a chainable node structure that enables any trusted entity to serve as a secure identity proofing provider without issuance of hardware or software tokens.

BACKGROUND

Blockchain is a technology that ensures that data, once generated, cannot be easily modified without detection. More specifically, a blockchain is a series of data blocks or nodes linked cryptographically, with each block including a cryptographic hash of the previous, i.e., predecessor, block. These blocks linked cryptographically are referred to as a chain. Starting from a block in the chain, to identify a predecessor block, a computer system generates a hash of the blocks (the block content) in the blockchain until a block with hashed content is identified that matches the hash stored in the starting block. The search ends when a genesis block is located. A genesis block does not have a hash result included in its content. If no block matching the hash is found, then the chain is broken, indicating that data has been modified. Thus, blockchain is resistant to data modification. Because of this property, blockchain can be used for secure purposes, such as digital currency and audit records.

All blocks in a blockchain are structured/organized in a comprehensive graph, or improved Merkle tree structure. As blocks are added, the ledger of the chain (e.g., in a graph/Merkle tree) grows. Some ledgers are stored in a public cloud. Other ledgers are stored locally and not accessible to the public. Conventionally, over time blockchains become either deep, with many nodes in the chain, or wide, with the genesis or root block having a very high degree of branching.

SUMMARY

Implementations provide a secure, flexible, and distributed system for verifying the identity of an entity without relying on third parties to issue hardware or software tokens. Implementations generate a chain for the entity after a successful identity proofing process by an authorized organization. The chain is short, including only a handful of blocks for each entity. The entity can be a person or an object and is the subject of the identity proofing process. Each chain has a genesis block, which includes as part of its content data that describes a physical attribute of the entity, for example a 2- or 3-dimensional image of the entity, a biometric marker, an image of real property, etc. At least one block in the chain includes content relating to the documents used in the successful identity proofing. Other blocks can include other information and/or actions performed at the authorized organization for the entity.

The entity itself or owner of the entity (if the entity is an object) provides a signature key after successful identity proofing. The signature key is used in generating the chain, e.g., by being included in the input provided to a hash function that generates the cryptographic hashes that link the chain and/or by providing the key that encrypts the block content before a block is stored. In either case, the signature key is necessary to verify a chain. The signature key may be provided by the keeper of the entity (e.g., the person or an owner of the object). The signature key can be anything selected by the keeper of the entity. Nonlimiting examples include a favorite phrase or line, a first pet's name, an image, favorite song, favorite quote, a combination of names, birthdates, addresses, etc. The signature key may be provided by the entity, e.g., data stored in a specific memory address, an image of a particular portion of the object, a location for the object (e.g., a current location or a location of origin), etc. The authorized organization can offer a service to verify an entity. To verify an entity the authorized organization needs some property (e.g. name) used to locate the last block for the entity's chain and a query key. The query key corresponds to the signature key. Put another way, the query key has the same function as the signature key, but is provided as part of a verification of a chain rather than generation of a chain. If a chain is located using the query key and the property the verification is successful. In some implementations, the query response can include data from the genesis block or some other block in the chain in addition to an indication of the successful verification.

Without disclosed implementations, secure identity verification conventionally requires a third party company. For example, conventionally after a hospital verifies the identity of a doctor in accordance with appropriate regulations and laws the hospital issues a hardware token to the doctor so that the doctor can use the token to access secure hospital computer systems. Such tokens are serviced by third-party companies. Instead of having to involve a third party company, and risk the loss of a token, the hospital can use disclosed implementations in place of the hardware token. For example, before gaining access to computer systems the doctor may be asked to provide a query key and a search field, such as a name, as query parameters. Disclosed implementations can use the provided query parameters to determine whether or not a chain exists in the graph; if no chain can be identified the verification is not successful. In some implementations further security can be added by comparing the data of the genesis block (e.g., describing a physical characteristic) or data from some other block to data obtained from the doctor at login. Thus, for example, the doctor may be asked for a fingerprint or face scan and this may be compared to the data obtained from a successfully identified chain. If the data fails to match the verification request may fail, even if a chain was successfully identified. In some implementations, this additional check may be done by the requesting process. In other words, a successful verification may provide the genesis block data back to the requesting process and the requesting process can use the data to perform the second verification.

As another example, a remote-controlled device or devices, such as a drone or drone network, may be configured with instructions. To avoid acting on instructions sent from an unauthorized user, the drone may be configured to verify the identity of an entity providing the instructions before accepting the instruction. In other words, the drone may act as a verification service, storing one or more identity blockchains and requiring verification of a chain before acting on instructions. As another example, an organization may receive data from a network of connected devices. The devices may provide data (e.g., sensor readings, images, etc.) to the organization. In such a setup the organization may store one or more identity blockchains for the network, e.g., one genesis block for the network and several chains branching off the network, one for each device in the network. Using disclosed techniques, a device may provide a signature key with the data and, before the receiving system accepts the data, the receiving system may verify the device against a blockchain using a signature key provided with the data.

BRIEF DESCRIPTION OF THE DRAWINGS

The methods, systems and/or programming described herein are further described in terms of example implementations. These example implementations are described in detail with reference to the drawings. These implementations are non-limiting examples, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

Implementations provide a framework that enables authorized organizations to maintain and provide blockchain proof of identification. Specifically, an authorized organization can generate a chain after a successful identity proofing process and then provide an interface, e.g., an application program interface (API) that enables others to send a verification query for an entity and receive a query response. The response indicates that the purported entity has either been verified or has not. The response can also include information taken from a block or blocks in a verified chain from which the requestor can perform an additional verification.

Figure 1:
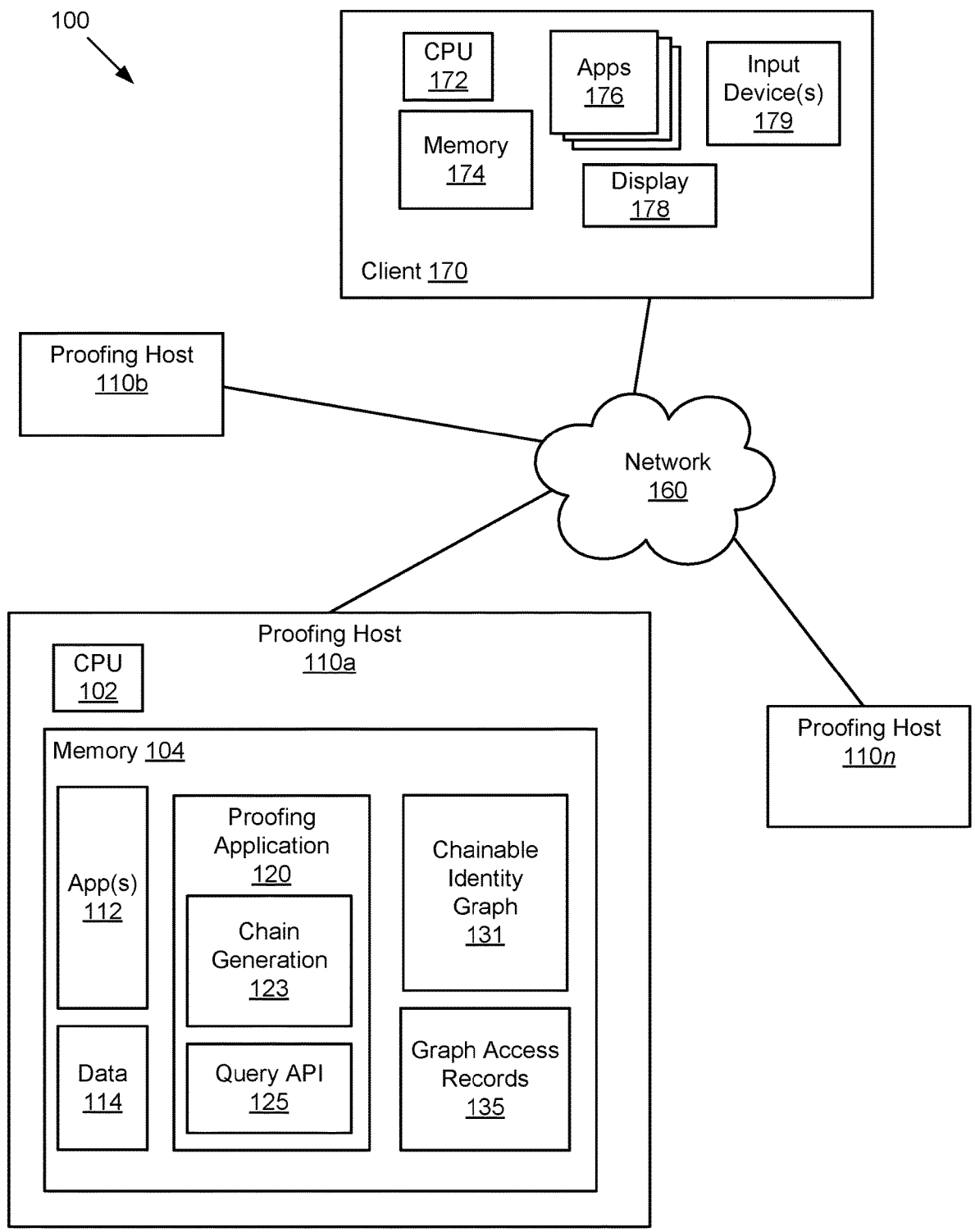
FIG. 1 describes a high-level depiction of a system configuration, according to an implementation.

As shown in FIG. 1, a networked environment 100 may include a number of computing devices that are in data communication with each other through a network 160 or a series of networks 160. The network 160 may include the Internet, a local area network (LAN), a wide area network (WAN), a cellular network (e.g., 5G cellular), an intranet, etc., or some combination of these. For example, client 170 may communicate with one or more proofing hosts 110 via a LAN, a cellular network, an intranet, or the Internet. Proofing host 110*a* may communicate with proofing host 110*b* and/or 110*n* via any combination of the Internet, intranet, a WAN, a LAN, a cellular network, wired connection, wireless connection, etc. In some implementations, the network 160 represents more than one network, e.g., the Internet and a WAN or the Internet and a WI-FI or cellular network.

The computing devices in environment 100 may include host computers, such as proofing hosts 110*a*, 110*b*, and 110*n*. The computing devices may also include client devices, such as client 170. Client 170 provides a user interface, for example via a browser, a mobile application, or some other interface, for a human user to access a query functionality, e.g., via query API 125, of a proofing host 110 over network 160. The client 170 may also access other various applications, including applications 112 provided by the proofing host 110*a* and similar applications provided by other proofing hosts, other cloud-based applications, etc.

The proofing host 110*a* (e.g., also 110*b*, 110*n*, etc.) may be a web-based system for an authorized organization, such as a financial organization, a government agency or department, a financial institution, an educational institution, a healthcare related organization, a licensing organization, a utility, a company, etc. The proofing host 110*a* may require its users (e.g. employees or customers) to login with login credentials (typically a username and a password or the like) before accessing the applications 112 and/or proofing application 120 of the proofing host 110*a*. The proofing host 110*a* may include a computing device, such as a computer, a server or a number of communicatively connected distributed servers, a mainframe, etc., that has one or more processors 102 (e.g., a processor formed in a substrate) configured to execute instructions stored in memory 104, such as main memory, RAM, flash, cache, or disk. The instructions may be stored in a runtime environment, functional modules and/or engines, e.g., applications 112, proofing application 120, and may provide functionality to support the functioning and operation of the authorized organization (trusted entity). In some implementations, the proofing host 110*a* may be a device, e.g., a remote-controlled device performing verification before accepting and acting on instructions, e.g., updating data 114 and/or running an app 112.

As used herein, an authorized organization is any organization, e.g., company, agency, group, professional organization, etc. or a remote-controlled device, that performs an identity proofing process. An authorized organization can also be referred to as a trusted entity. An authorized organization performs an identity proofing process as part of at least one service or task. As used herein, an identity proofing process is a process performed with the purpose of verifying something about an entity. An identity proofing process typically relies on specific documents to complete the identity proofing process. Non-limiting examples of an identity proofing process include the process of obtaining a license, a bar certification, a passport, etc., a process for hiring a new employee, a process verifying a land or car title, a process for setting up billing, a process for setting up a connected network of devices or setting up a remote-controlled device, etc. Thus, a successful identity proofing process may include at least one supporting document, e.g., a birth certificate, a title, a license, a social security card, current piece of mail, a location, a device identifier, an image of a specific portion of a device, etc. The result of an identity proofing process may be a verification of an identity of a person, verification that an object is what the object claims to be; verification that an object is owned by a person, verification that an object is part of the network, etc. An identity proofing process can be rigorous (e.g., obtaining a passport or bar admission) or relaxed (e.g., setting up power to a home). Thus, each authorized organization, through its respective identity proofing process, may represent a different level of assurance about the identity of the entity. The entity can be a person, an animal, a physical object, or a digital object (e.g., a connected network of devices, such as a drone network, an Internet-of-things network, etc.).

In some implementations, one or more applications 112 may enable a user of the proofing host 110*a* to complete or to document the identity proofing process. In such implementations the application may call or invoke proofing application 120 after successful completion of an identity proofing process for an entity. In some implementations, the user (a representative of the authorized organization associated with proofing host 110*a*) may directly call or launch proofing application 120 after a successful completion of the identity proofing process for the entity.

Proofing application 120 generates an identity chain for the entity in the chainable identity graph 131. The identity chain includes a genesis block (or genesis node) for the entity. The genesis block is a first block in the chain and does not have a pointer to another block. In some implementations, the genesis block has content that captures a physical property of the entity. As non-limiting examples, the content of the genesis block may include a two-dimensional picture of the entity (or a portion of the entity), a three-dimensional picture of the entity, biometric data (fingerprints, retinal scans, DNA sequences), a voice print, an image of a title, data from a specific memory location of a device, etc. An identity chain is a short blockchain, e.g., with only a few (3, 5, 10) blocks in the chain for an entity. The blocks are stored in a chainable identity graph 131. The chainable identity graph 131 may have a genesis block for entities for which the authorized organization has completed a successful identity proofing process. Each entity has a respective genesis block in the chainable identity graph 131. The genesis block may also be referred to as the root of the identity chain. Each chain in the chainable identity graph 131 is rooted to a genesis block. In some implementations, an entity may have more than one chain rooted to its genesis block. For example, a person who changes their name and provides proof of this to the authorized organization may have two chains rooted to the same genesis block. As another example, a remote device may have two or more chains rooted to its genesis block, one for each unique user authorized to operate the remote device. As another example, a network of remote devices can have one chain for each authorized device rooted to a genesis node for the network. Alternatively, each remote device could have its own genesis node and identity chain. In some implementations, an identity chain may have a main chain and side chains may represent less authority. For example, a remote device may execute instructions when a main chain is verified but may only respond to queries when a side chain is verified.

The chainable identity graph 131 is unlike a conventional database or similar record repository. First, conventional database records are typically amenable to change. Chainable identity blocks (also referred to as blocks or identity nodes) are not amenable to change, and a change in any identity block in the chain results in a broken chain unless all successor blocks are also identified and modified. Because any changes to identity blocks involve significant costs in time and computing power, such changes are impractical. This immutability makes a chainable identity graph 131 resistant to fraud and identity theft. The chainable identity graph 131 may be an improved Merkle tree, where the different blocks are linked only via inclusion of a hash of the predecessor block. Each identity block in a chain has content. The content includes payload data and the hash result of its predecessor's content. A genesis block is identifiable as the genesis block because it lacks a hash result. As used herein, reference to hash as a noun is the same as reference to a hash result, and vice versa.

The blocks in the chainable identity graph 131 may record aspects of the successful identity proofing processes. For example, one or more identity blocks may have as payload data information about the document or documents used in the identity proofing process. For example, such a block may record the type of the document(s), an image of the document(s), and one or more data items extracted from the document(s). One or more identity blocks may have as payload data information from a document or credential issued as a result of the successful identity proofing process, e.g., a driver's license number, a passport number, a title, etc. One or more identity blocks in a chain may have a recording relating to the entity, e.g., a recording of a voice. One or more identity blocks in a chain may have as payload data information about an activity relating to the entity. For example, when the authorized organization is a department issuing a license, a person renewing the license may have a new identity block (or blocks) added to that person's identity chain. One or more identity blocks in a chain may include any digitized materials that improve or support the consistence and comprehensiveness of a block.

Implementations also include graph access records 135. The graph access records 135 facilitate identification of a last node in an identity chain for a particular entity. The graph access records 135 store records that include searchable properties of entities. These searchable properties are referred to as key properties or search fields. Key properties do not need to uniquely identify an entity, but should be identifying properties of an entity. Examples of key properties are first and last name, birth date, license plate number, plot number, address, etc. In addition to one or more key properties a record in the graph access records 135 also includes a hash result of the next block in the chain. Thus, regardless of whether a graph access records 135 are stored as blocks in the chainable identity graph or as a table or in some other format, a graph access record is considered a final node in the identity chain.

The identity chains of the chainable identity graph 131 differ from other blockchains in the use of a signature key needed to successfully traverse the chain and locate the genesis block. This signature key is selected before a chain is generated and is selected by the keeper of the entity. If the entity is a person, the keeper of the entity is the person himself/herself. If the entity is not a person, the keeper of the entity is a person claiming stewardship of the entity. The signature key can be any data selected by the keeper of the entity. For example, the signature key can be an image, a quote, a favorite author/book/movie/destination/date/food, etc. If the entity is a device reporting data, the keeper of the entity may configure the device to report the signature key. The signature key for the device may be, e.g., a digital image or scan of a particular portion of the device, a location associated with the device (e.g., location of origin, current location), data from a static memory address, etc. The signature key can be a combination of data items, e.g., a name and date, a date and location, a quote and author name, etc. The signature key may have to conform to rules set by the authorized organization, but can otherwise be anything the entity keeper selects. The signature key is used to generate the identity nodes but is never stored by the proofing host 110a. The signature key is only used by the proofing host 110a in generation of identity nodes and in querying the chainable identity graph 131. This increases the security of the identity chain but avoids the risk of losing a key needed to verify the chain. Because the signature key is selected by the keeper there is low risk of it being forgotten or lost in normal circumstances.

The proofing application 120 may include chain generation program 123 and query API 125. The chain generation program 123 may be configured to generate an identity chain subsequent to a successful identity proofing process. The chain generation program 123 may generate a genesis node from genesis data, may generate one or more identity nodes from data relating to the identity proofing process, and generate a graph access record as a final node in the identity chain. The chain generation program 123 may generate the chain using a signature key provided by the entity or the owner of the entity. In some implementations, this signature key may be combined with the content of a prior node and provided as input to the hash algorithm to generate a hash result for a prior node. Thus, for example, the signature key may be combined with the content of a genesis node before generating a hash result that will be stored in a first identity node. The content of that identity node (e.g., payload data and the hash result) may be combined with the signature key to generate a second hash result that is stored in a next identity node or in the graph access record. In some implementations, the signature key may be used as the key in an encryption process that encrypts the content of a node before storing the node in the chainable identity graph 131. In some implementations the signature key may be both used as input to the hash function and as an encryption key.

The proofing host 110a can use the chainable identity graph 131 to offer verification services. In a verification service a purported keeper of an entity (the entity or owner of the entity) provides a query key and query properties as parameters and the proofing host 110a uses this input to verify either that an unbroken chain is identified using the query parameters or that no chain is identified. If an unbroken chain is identified the verification is successful. If an unbroken chain is not identified the verification is not successful. The proofing host 110a may use the query API 125 to offer a query interface to other platforms, e.g., to one or more clients 170. The client 170 may provide the query parameters (the query key, search fields, and optionally return fields) and may receive a query response. The query response may be an indication of either successful or unsuccessful verification. The query response may include data from the genesis node. The data from the genesis node may be used for an additional verification step at the client. The query response may include data from other nodes in the chain. For example, any payload data from a node may be included in a response. In some implementations, the query requestor may ask for one or more data items to be returned with the verification success indicator, e.g., return fields.

A verification service is initiated by a verification request, also called a verification query or just a query. The proofing application 120 may verify whether a full identity chain exists in response to a query. The query can be initiated by a user of the proofing host 110a or client 170. A full chain verification starts with the last node in the chain (e.g., a graph access record) and follows a chain of identity nodes until a genesis node is reached. If a genesis node is not reached the verification fails. In some implementations, searching for blocks in the chainable identity graph 131 involves a brute force search. In a brute force search, starting from the last block, the system searches for a predecessor block in the graph. A predecessor block is a block with content that, once provided (optionally with the query key) to the hash function, results in a hash that matches the hash result stored in the last block. This process then repeats, with the hash result of the predecessor block being used to find its predecessor block, etc., until a genesis block is reached. A genesis block may be identifiable because it lacks a hash result stored as part of the content. This brute force search can be computationally expensive. In some implementations, the proofing host 110a may include special processors used to verify identity chains.

In some implementations, each block in a chain may include a data item that identifies the block as belonging to the same chain. This data item may not be encrypted even if the remaining content is encrypted. Thus, for example, once an identity block is located using the hash result of the graph access record, an identifier (e.g., a group identifier) may be used to narrow down the blocks in the chainable identity graph 131 that are possible candidates for the chain. Such a system is described in U.S. Patent Publication No. 2020-0265046-A1, which is incorporated herein by reference. In some implementations, the proofing application 120 may verify the chain for an entity before any additional actions can be taken on the entity.

In some implementations, the proofing application 120 may not change a chain once the chain has been generated. In some implementations, the proofing application 120 may add additional blocks to a chain in response to certain actions. Each authorized organization may set its own policies and rules for which actions add a block to a chain. One non-limiting example is a licensing entity that renews a license; the renewal action may be added to the chain after verification of the chain. In some implementations, the proofing application 120 may add branches off of a genesis block or another block in the identity chain for certain actions. In one non-limiting example, a name change (e.g., from marriage or divorce) may result in generation of a new chain branching off the genesis block for the entity. Alternatively, a name change may result in a new graph access record with the new name, so that the branching occurs further down the chain, i.e., further from the genesis block. In this example, branching could occur at any block in the chain. In some implementations, a branch that originates from the genesis block may use a different signature key for generating the new branch. In some implementations, this second chain (with a different signature key from the first chain) may have key properties that differ from the key properties of the first chain. In other words, the data items used to identify the graph access record that is considered the last block in the chain may differ between the two chains. In such an implementation, the entity may have two different ways of verifying a chain. Thus, for example, a network of devices may have a genesis node for the network and records the devices known to the network and have a separate chain for each device, so each device could verify the chain using its own signature key.

The client 170 may be a personal computing system, a terminal, a laptop, a tablet, a point-of-sale device, a mobile device, an enterprise system, a server, or other type of computing device/system configured to send and receive information over the network 160. The client 170 may include one or more processors 172 (e.g., a processor formed in a substrate) configured to execute instructions stored in memory 174, such as main memory, RAM, flash, cache, or disk. The client 170 may also include input devices 179, such as a microphone, a keyboard (virtual or physical), a touch screen, a mouse, a camera, a voice recorder, etc. The client 170 also includes a display 178 or other output device. The client 170 may also include one or more applications 176 that perform various functions, e.g., a browser, a word processing program, a spreadsheet program, an email client, a mobile application etc. The client 170 may communicate with the proofing host 110a (and/or proofing host 110b, 110n, etc.) via applications 176 calling the query API 125 using known techniques.

The environment 100 can also include several different proofing hosts, such as proofing host 110b and proofing host 110n. Although not illustrated in FIG. 1 for the sake of brevity, proofing host 110b and proofing host 110n may also include components illustrated for proofing host 110a. In some implementations, one or more of the proofing hosts may be operated by the same business entity, e.g., as a distributed system. In some implementations, the proofing application 120 may be configured to access graph access records 135 and/or chainable identity graph 131 stored at another proofing host 110. In some implementations, the proofing application 120 may be configured to coordinate a query with another proofing application executing on another proofing host 110.

The configuration of the proofing host 110a is one example and implementations include other configurations. For example, capabilities performed by the proofing application 120 may be included in one or more of the applications 112. Likewise, the query API 125 may be a standalone module or may be included in one or more of the applications 112. Similarly, the data, such as one or more of data 114, graph access records 135, and chainable identity graph 131 may be distributed across several computing devices and/or may be accessible by, but physically remote from, the proofing host 110a. Moreover, the environment 100 represents an example environment. Although illustrated with specific components in FIG. 1, the environment 100 may include additional components not illustrated, or may not include all elements shown. In addition, some components may be combined into a single component. Moreover, the proofing host 110a is understood to be configured to comply with any applicable laws, regulations, or other conditions relating to the data input and the data obtained from the data sources.

Figure 2:
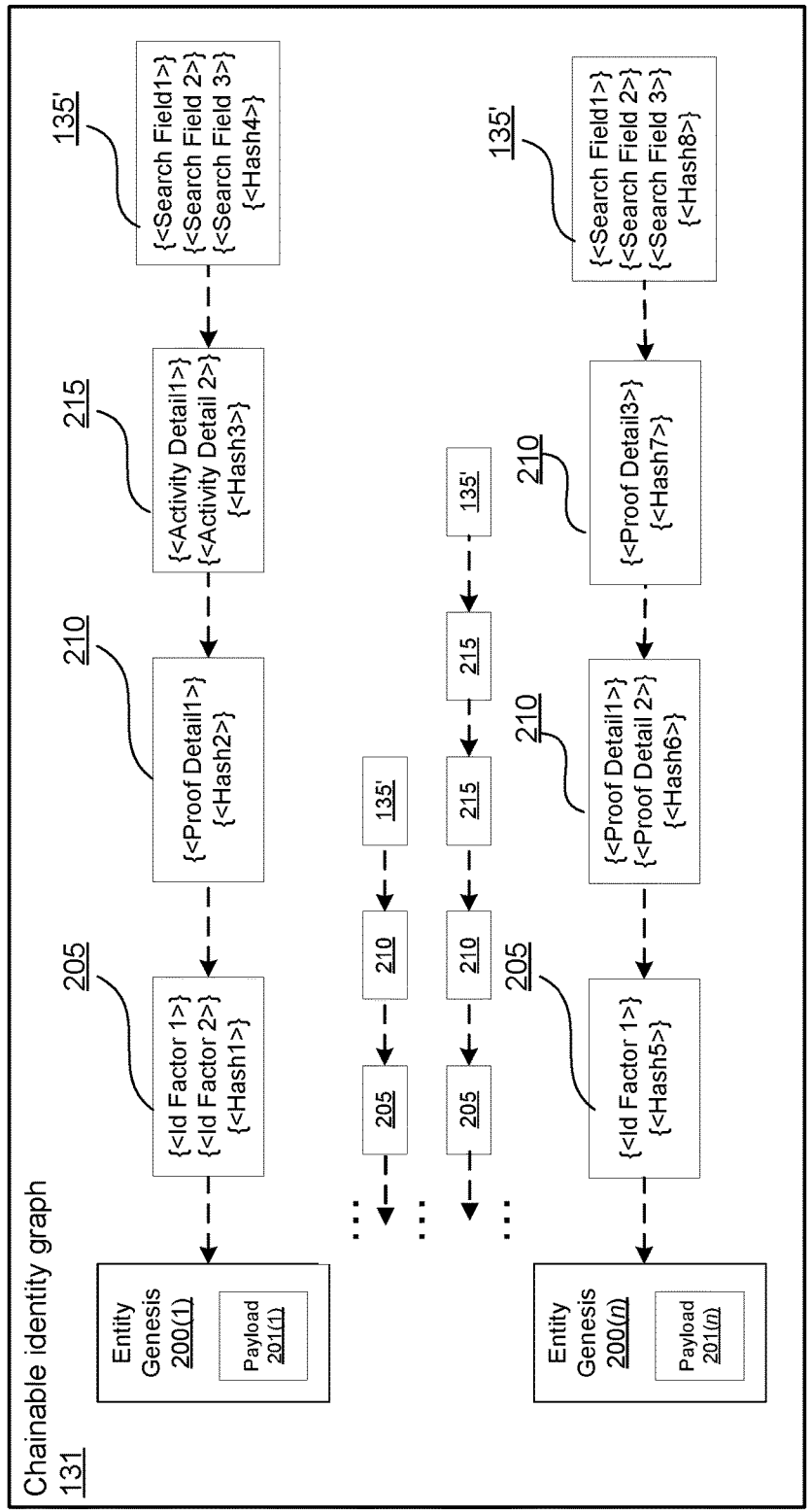
FIG. 2 describes a block diagram of example elements used in blockchain proof of identification, according to an implementation.

FIG. 2 illustrates a block diagram of example elements used in blockchain proof of identification, according to an implementation. The chainable identity graph 131 includes several entity genesis blocks 200, e.g., block 200(1), to 200(n). The genesis blocks 200 represent roots of identity chains. Each genesis block 200 has associated payload data 201, e.g., payload data 201(1) to payload data 201(n). The payload data of a genesis block may also be referred to as genesis data. The genesis data may be any data that captures a physical property of the entity. In some implementations, the genesis data may uniquely identify the entity. In some implementations the genesis data need not be unique to the entity. Nonlimiting examples of genesis data include images (2- or 3-dimensional) of the entity, biometrics obtained from the entity (including genetic data, fingerprints, voice prints, retinal scans, etc.), an address of real property, an image of a vehicle identification number, a spectral analysis of a painting, etc. In some implementations, the payload 201 is encrypted before it is stored. Some implementations may use the signature key obtained from the entity's keeper as an encryption key. As disclosed herein, the signature key can be anything selected by the entity or, if the entity is not a person, an owner of the entity. The genesis block 200 is considered a first block in an identity chain. The content of a genesis block 200 is the payload data 201.

The chainable identity graph 131 may have hundreds, thousands, or even millions of identity chains. An identity chain runs from a genesis block to a graph access record, which is a record in graph access records 135. Blocks between the graph access record and the genesis block may be referred to as linking blocks. In the example of FIG. 2, linking blocks include blocks 205, 210, and 215. The linking blocks may have different payload data. For example, in the example of FIG. 2 blocks 205 include information about an identification factor used in the identity proofing process. Blocks 210 of FIG. 2 have payload data that includes other information obtained in, generated by, or relevant to the identity proofing process. Blocks 215 include payload data relating to an activity. As illustrated in FIG. 2, identity chains may have any number of blocks, but are generally short (between three and 10 or 15 blocks). The types of linking blocks illustrated in FIG. 2 are used for illustrative purposes and blocks in an identity chain can include different types of data. The content of a linking block is the payload data and a hash result. The hash result is generated from the content of a previous block in the chain. Thus, for example, <hash1> may be a hash result generated using the payload data 201(1) and <hash2> may be a hash result generated using <Id Factor 1>, <Id Factor 2>, and <hash1>, etc.

The linking blocks in the chainable identity graph 131 are generated using a signature key. The signature key can be used in different ways, dependent on the implementation. For example, some implementations may combine the signature key with the content of a previous block to generate the hash result that is stored in the next block. For example, <hash1> may be a hash result generated using the payload data 201(1) and the signature key while <hash2> may be a hash result generated using <Id Factor 1>, <Id Factor 2>, <hash1>, and the signature key, etc. In some implementations, the signature key may be used to encrypt the content of a block before it is stored. In such implementations, the content of a block is decrypted using a query key before being provided to a hash algorithm that generates the hash result. If the query key does not match the signature key used to encrypt the content, the proofing program will fail to find an unbroken chain. Combinations of these are also possible. For example, the content of the blocks may be encrypted using the signature key and the encrypted content may be combined with the signature key as input to the hash algorithm. As another example, the hash result may be generated from a combination of the signature key and the content of a block and the signature key may be used to encrypt the content of the block. Implementations include other similar uses of the signature key in generating the identity chain. Signature keys are not stored as part of the chainable identity graph 131 or the graph access records 135, which increases the security of the verification process.

Each identity chain ends with a last block that enables identification of the chain using some search fields. The search fields are referred to as key properties of the entity. Key properties need not (but may) uniquely identify an entity. Key properties will greatly reduce the number of potential chains to investigate in response to a query. Example key properties include first and last name, birthdate, address, license number, social security number, account number, etc. The last block is also referred to as a graph access record. The graph access record may have a format similar to other blocks in the identity chain, e.g., such as graph access record 135' illustrated in FIG. 2. Graph access record 135' is stored as a block in the chainable identity graph 131. In such implementations, the search fields (key properties) may not be encrypted even if the remaining blocks in the chain have encrypted content. This improves query response time. In some implementations, the last block may be a record in a table, such as graph access records 135" illustrated in FIG. 2. A table further improves query response time because the search fields can be indexed so that a responsive graph access record 135" can be quickly located. Each graph access record includes a hash result, e.g., hash 265. The hash 265 is generated from the input of the penultimate block in the chain. Thus, for example, <hash8> is generated from <Proof Detail3> and <hash7> and optionally a signature key.

Although considered a last block in the chain, graph access records 135 differ from the other blocks in that the graph access records 135 remain the last block in the chain. In other words, if a block is added to the chain the block is added after the penultimate block in the chain and takes as its hash result the hash result stored in the graph access record. The graph access record receives a new hash generated from the inserted block to replace its current hash. Thus, for example, if a new block is inserted in Susan Jones' identity chain, the new block takes <hash8> in its content and hash 265 of Susan Jones' graph access record is updated with a new hash result, e.g., <hash9>, generated from the content of the new node. In some implementations, the update occurs by deleting the old graph access record and inserting a new graph access record. Of course, if a new block forms a branch off of another block in the chain, the second chain has its own last block.

The graph access records 135" illustrated in FIG. 2 have three key properties; search field 250 (last name), search field 255 (first name), and search field 260 (birth year). However, these are examples only and implementations may include fewer search fields, additional search fields, or different search fields, depending on the trusted organization's configuration and preferences. Reference to a field, as used herein, refers to either the field name, the field value, or both, depending on context. For example, a query may have a search field as a parameter. It is understood that the field represents a certain type of data (e.g., the field name) and has a value, so referring to the search field refers to the type of data and its value. Similarly, a block in a chain may include one or more fields in the payload; however the block may only store the value of the field. In some implementations, the field name (type) may be implied. In some implementations, the field name may be determined based on the position of the field within the content, for example the order in a comma delimited list or the byte positions. In some implementations, the field name may be paired with the value.

Figure 3:
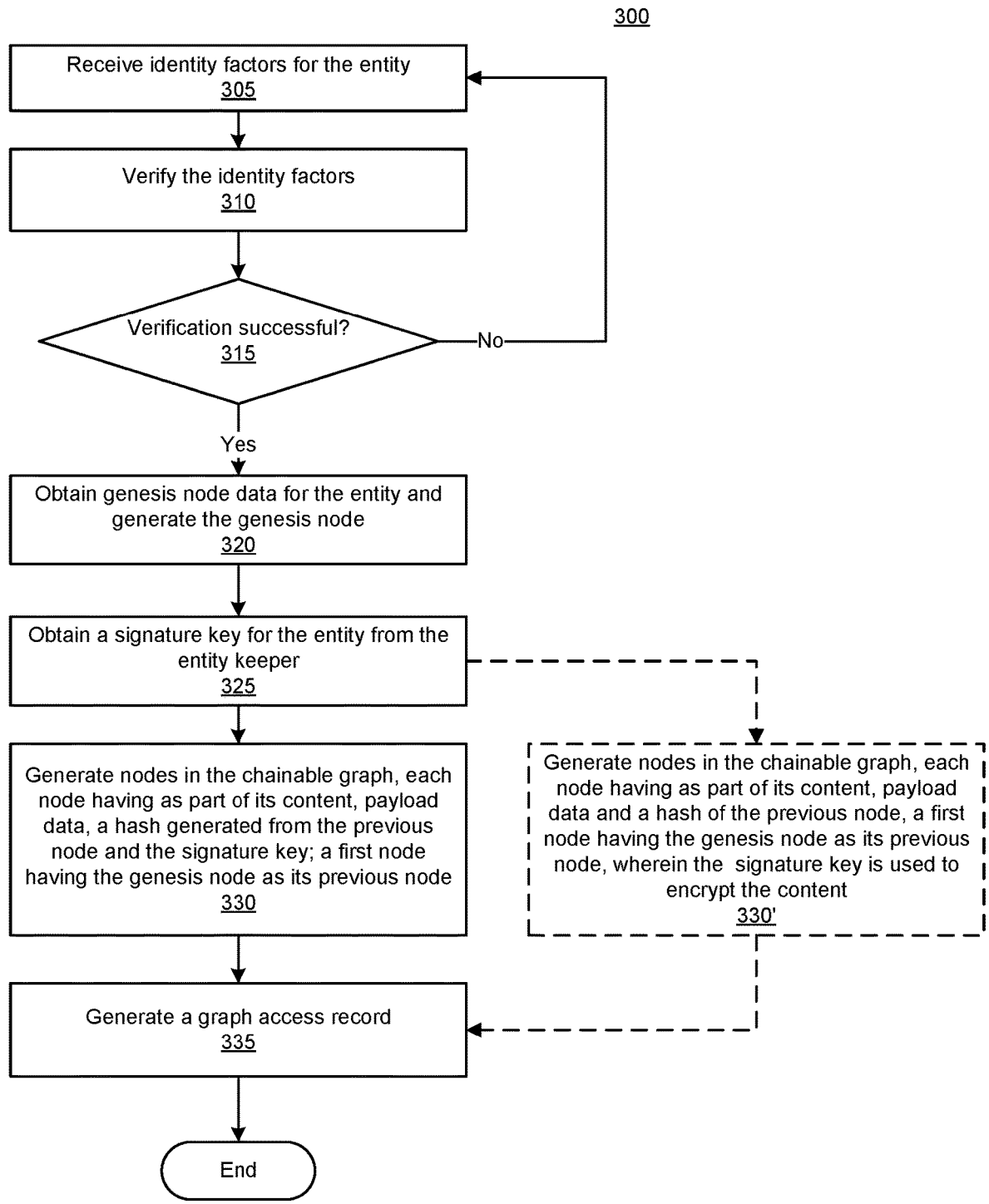
FIG. 3 illustrates a flowchart of an example process of generating a chain for an entity used in blockchain proof for identification, according to an implementation.

FIG. 3 illustrates a flowchart of an example process 300 of generating an identity chain for an entity, according to an implementation. Process 300 may be employed by a trusted organization in conjunction with an identity proofing process. Process 300 may be performed at least in part by a system, such as proofing host 110a of FIG. 1. Process 300 generates an identity chain for the proofed entity from data items related to the identity proofing and from a signature key selected by and received from the keeper of the entity (e.g., the entity if the entity is a person or a person who owns the entity). Process 300 may include an identity proofing process represented by steps 305 to 315. In some implementations, a portion of these steps may be performed by a representative of the trusted organization, e.g., by an employee.

Process 300 may begin with receiving identity factors for the entity (305). Identity factors can be any data items that establish the identity of the entity to the trusted organization. For example, identity factors can include a birth certificate, a license, a marriage certificate, a passport, a piece of mail with an address, a title, a deed, a social security card, a certificate of provenance, an appraisal, a biometric factor (iris, voice, fingerprint, faceprint), etc. In some implementations, the identity factors may be verified (310), e.g., by the representative of the trusted organization or by an automated process. If the verification is not successful (315, No), the entity has failed the identity proofing process and an identity chain is not generated for the entity. If the verification is successful (315, Yes), the identity proofing process is successful. If not already provided in a format accessible by the system, the identity factors may be entered into or otherwise made available to the system if the verification is successful. Responsive to a successful identity proofing process the system may obtain genesis node data and generate a genesis node (320). In some implementations, the genesis node data captures some physical property of the entity. In some implementations, the genesis node data may include digital identification information, such as a digital key, IP address, etc. The genesis node can also include supporting data elements, such a logo (2D or 3D), a domain name, etc. The system may also obtain a signature key from the keeper of the entity (325). The signature key is selected by the entity's keeper. In some implementations the signature key may have size or format requirements set by the trusted organization. Outside of requirements set by a particular trusted organization there are no limits on what a signature key may be. In some implementations the signature key is obtained before generating the genesis node. For example, where the signature key is used to encrypt the genesis data, the signature key may be obtained before generating the genesis node.

The signature key is used in generating additional identity nodes in the identity chain. The number of nodes and the payload of the various nodes are implementations details that can be set by the trusted organization. Thus, disclosed implementations are not dependent on any particular chain length or payload data. The system may generate nodes that each have as content: payload data and a hash generated from input that includes the content of the previous node (330, 330'). In some implementations the input used to generate the hash includes the content of the previous node and the signature key (330). In some implementations, the system generates the hash and then encrypts the content of the node using the signature key as an encryption key (330'). In some implementations, the system may combine the signature key with the content and use this as input to the hash function and encrypt the content of a node using the signature key. The system stores the nodes in a chainable graph. As a last node in the chain the system generates a graph access record (335). The graph access record includes a search field (or fields), or in other words a key property (or properties), for the entity. These fields may have been included in payload data in one or more nodes. These fields may have been obtained specifically for the graph access record. The graph access record also includes a hash result of the last node generated in the chain, e.g., as part of 330, 330', or a combination of these. The hash is generated in a manner similar to that used to generate the nodes in the chain. Process 300 then ends.

Figure 4:
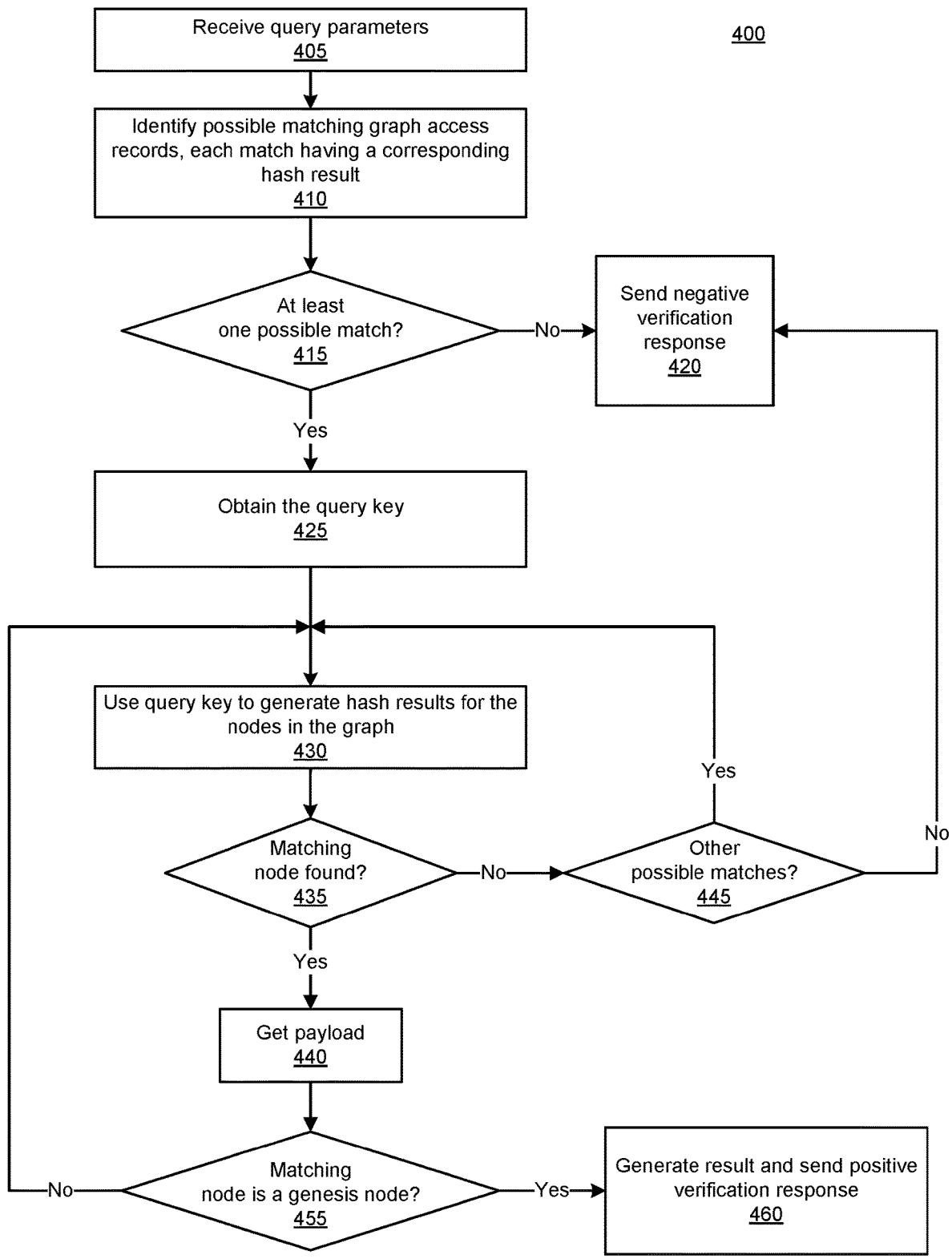
FIG. 4 illustrates a flowchart of an example process of using a chain as proof for identification, according to an implementation.

FIG. 4 illustrates a flowchart of an example process 400 of using an identity chain as proof for identification, according to an implementation. Process 400 is an example of a query process that can be initiated by a client or as an initial step at the trusted organization. Process 400 may be performed by a proofing host, such as proofing host 110*a* of FIG. 1. Process 400 takes as input query parameters and provides in response an indication of whether an identity chain was located using the query parameters. In some implementations, the response may also include data items obtained from the payload of the nodes in the identity chain.

Process 400 may begin in response to receiving query parameters (405). The query parameters may specify one or more search fields. The fields may be controlled by the trusted organization via a specific API. For example, the trusted organization may make only certain fields available for the query requestor to provide as parameters. In some implementations the fields correspond to the search fields available in the graph access records. In some implementations, the fields may include additional fields, e.g., requesting particular data items available in the payload of the nodes in the chain. The fields included in the query parameters may be collectively referred to as key properties. In addition to the key properties the query parameters include a query key. The query key corresponds to the signature key. The query key is used to traverse a chain from a graph access record (or records) to a genesis node. Failure to reach a genesis node from a graph access record using the query key results in an unsuccessful verification response.

Accordingly, the system uses the search fields to identity matching graph access records (410). A graph access record is a matching record when the search field(s) in the graph access record match the field(s) provided in the query parameters. If no matching graph access records are found (415, No), the system sends a negative or failed verification response (420) and process 400 ends. If at least one matching graph access record is identified (415, Yes), the system obtains the query key, or in other words a signature key. This key is provided by the keeper of the entity being verified. In some implementations, the query key may have been provided as part of step 405. The system uses the query key to traverse the nodes in the chainable graph to determine whether a full chain (e.g., from the graph access record to a genesis node) exists. This is an iterative process represented by steps 430 to 460 that starts with the last node (the graph access record) as the "current" node. The current node has a hash result and the system tries to match that hash result with one calculated for a node in the graph. This process includes using the key as either additional input to the hash function or as a decryption key, or as both, depending on the implementation and as described herein. If no matching node is located (435, No) then the system failed to find a full chain for the combination of the query key and the graph access record. If there are no other possible matching graph access records (445, No), the system may send a negative verification response (420) and process 400 ends for this entity. If there is at least one additional matching graph access record (445, Yes), process 400 continues using that graph access record as the "current node" and the system attempts to locate a chain from that node to a genesis node using the query key. In some implementations, data may be provided with the query and the system rejects the data in response to an unsuccessful verification request, or in other words a negative verification response. For example, the data may be instructions, e.g., for a drone or other remote device, and the remote device rejects or fails to act on the instructions in response to an unsuccessful verification request. As another example, the data may be readings taken by sensors and the data may be rejected and not included in analysis responsive to an unsuccessful verification request.

If a matching node is found (435, Yes), the system may extract some or all of the payload of the node (440). The payload may be used in generating a search result if a genesis node is reached. Step 440 is optional. In some implementations the system extracts the payload data of only some nodes. In some implementations, whether payload data is extracted or not, and from which nodes, may depend on the search fields identified in the query parameters. If the node is not the genesis node (445, No), the system uses the node as the current node and begins a search for the previous node, e.g., at 430. If the node is a genesis node (455, Yes), the system has successfully identified a full chain and sends a positive verification response (460). In some implementations, only an indication of the success is provided in response. In some implementations, one or more data items obtained from the payload of one or more nodes in the chain is provided. In some implementations the payload of the genesis node is provided with the successful response. The additional data can be used by the requestor to perform additional checks for the entity. For example, where the genesis data is an image of the entity, the requesting process may display the image at the client so that a user can verify that the entity being presented matches the entity in the image. As another example, an age may be included in the response and the requesting process can verify whether the entity being presented meets some age qualification (e.g., is over 21 and may purchase alcohol). The data from the payload can be trusted by the query requestor because it is immutable; i.e., difficult to modify and has a high certainty of being accurate. Thus, for example, a store clerk could easily determine whether a license presented in the store is fake. In some implementations, data may be provided with the query and the system accepts the data in response to a successful verification request. For example, the data may be instructions, e.g., for a drone or other remote device, and the remote device acts on or executes the instructions in response to a successful verification request. As another example, the data may be readings taken by sensors and the data may be accepted for analysis responsive to a successful verification request.

Figure 5:
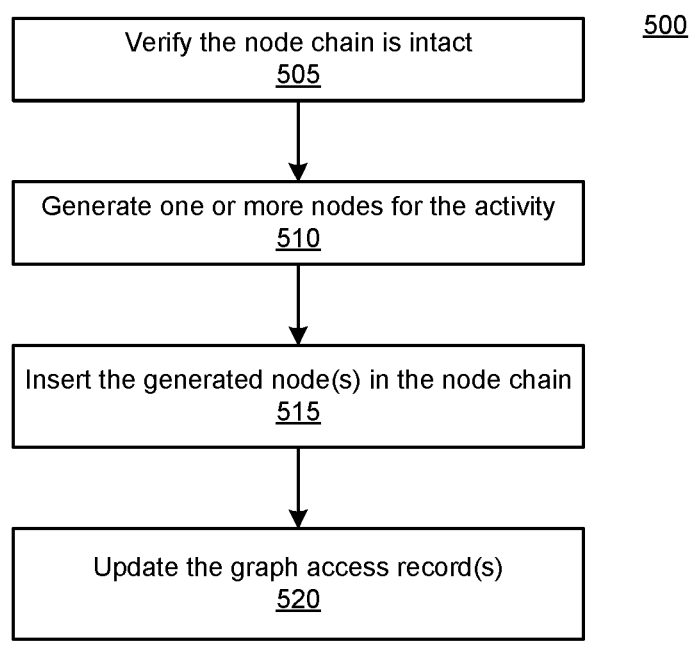
FIG. 5 illustrates a flowchart of an example process for adding blocks to a chain, according to an implementation.

FIG. 5 illustrates a flowchart of an example process 500 for adding nodes (blocks) to a chain, according to an implementation. Process 500 may be performed subsequent to generation of the original chain by a system, such as proofing host 110*a* of FIG. 1. Process 500 may enable the system to insert additional nodes into the chain. A trusted entity may do this to add an additional way to verify the entity, e.g., giving a co-owner a chain branching off of the existing genesis node or giving a person who has changed their legal name an additional branch. Another reach may be to add a second license to a person, such as a department of motor vehicles adding a motorcycle license to a person who has a conventional driver's license. Process 500 may also be used to add nodes documenting certain activities related to the entity. Process 500 may thus be understood to enable addition of a single node after the penultimate node in the chain, to insert a second graph access record for the chain, or to insert a separate chain from the genesis node, etc.

Process 500 begins by verifying that the chain is intact 505. In other words, before adding any nodes to a chain process 500 may use a process, such as process 400 of FIG. 4, to verify the identity of the entity for which a change is being made. Depending on the activity that caused the system to invoke process 500, a second identity proofing process may have been successfully completed. Other activities do not have need of a full identity proofing process but may be initiated after successful verification for the entity. A new node or nodes are generated for the activity (510). The generation of the new nodes may use the same signature key that was used to verify the chain, e.g., in step 505. The generation of the new nodes may use a new signature key and generating the new nodes may include obtaining the new signature key. The new nodes are inserted into the chain (515). If a new signature key is used the new nodes may be inserted off the genesis node, e.g., as a new branch off the genesis node. If the same signature key is used, the new nodes can be inserted so as to branch off of any node in the chain. In some implementations, each insertion gets a new graph access record, so that each insertion generates a new branch. In some implementations, the new node (or nodes) may be inserted off of any of the nodes in the chain. In some implementations, the new node (or nodes) are inserted into the chain, e.g., before the graph access record. The system updates or adds a graph access record (520), as appropriate. Process 500 then ends.

A working example is now described. This example is provided to aid in the understanding of this disclosure and implementations are not limited to the specific scenario described, as the methods and techniques can be adapted to other types of environments, as described above. Implementations thus include adaptations of the underlying technology and techniques to other industries.

An accreditation body, such as a medical licensing board, is one example of a trusted organization. A licensing board is subject to regulations that ensure that licensed practitioners are properly vetted and identified. For example, for a physician to obtain a medical license the physician may submit several forms of identification and likely additional verification documents, such as medical school transcripts, a character and fitness application, a credit report, etc. After the medical licensing board verifies all application materials the medical licensing board may generate an identity chain for the physician. For example, the board may take a 2- or 3-dimensional scan of the physician's head. The scan may be used as the genesis data in the genesis block of the identity chain. The physician may provide a signature key, such as the first line of the physician's favorite novel. The system uses the signature key in generating a second node in the chain. The second node may include information about the forms of identification used in the identity proofing process, such as an image of a birth certificate or the information off the birth certificate. The signature key may be used in generating a hash stored as part of the content of the second node. For example, the signature key may be combined with the scan and provided as input to a hash function. The result of the hash function becomes part of the content of the second node. In some implementations, additional nodes are generated. A graph access record is then created. The graph access record may include the name of the physician and/or a physician identifier issued to the physician. The graph access record also includes a hash generated from the content of the second node and the signature key. This hash is then stored with the graph access record. Alternatively or additionally, the signature key may be used to encrypt the content of each node in the chain before it is stored. In such implementations, the signature key is provided at query time to decrypt the node content before it is provided to the hash function.

The medical licensing board may then offer verification services for clients. Thus, for example, a hospital may use the verification services as part of a login procedure. For example, in order to access the electronic health records at the hospital the physician may be required to use a login procedure that takes as input a query key and the name of the physician. These query parameters may be transmitted to the licensing board's server where the parameters are used to determine if an identity chain exists. If one is found, the licensing board's servers may provide the scan data from the genesis node of the chain. In some implementations, the hospital may scan the physician's head and determine whether the scans match. If the scans do match, the hospital grants access to the physician.

In the configurations described above, a computer processor can refer to one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display, played on speakers, etc. An apparatus or device refers to a physical machine that performs operations, for example, a computer (physical computing hardware or machinery) that implement or execute instructions, for example, execute instructions by way of software, which is code executed by computing hardware including a programmable chip (chipset, computer processor, electronic component), and/or implement instructions by way of computing hardware (e.g., in circuitry, electronic components in integrated circuits, etc.)—collectively referred to as hardware processor(s), to achieve the functions or operations being described. The functions of embodiments described can be implemented in any type of apparatus that can execute instructions or code.

More particularly, programming or configuring or causing an apparatus or device, for example, a computer, to execute the described functions of embodiments creates a new machine where in case of a computer a general purpose computer in effect becomes a special purpose computer once it is programmed or configured or caused to perform particular functions of the embodiments pursuant to instructions from program software. According to an aspect of an embodiment, configuring an apparatus, device, computer processor, refers to such apparatus, device or computer processor programmed or controlled by software to execute the described functions.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD). Examples of the optical disk include a DVD (Digital Versatile Disc), DVD-ROM, DVD-RAM (DVD-Random Access Memory), BD (Blu-ray Disk), a CD-ROM (Compact Disc—Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the proofing application and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

In one general aspect, a system includes at least one processor, an identity graph storing identity blocks, the identity blocks including genesis blocks and graph access records, and memory storing instructions that, when executed by the at least one processor, cause the system to perform operations. The operations include receiving at least a property identifying an entity and a query key, the query key being data originally selected by a purported keeper of the entity. The operations also include identifying a possible match for the property from graph access records, the possible match having an associated hash result, the possible match and associated hash result being considered a current node in a chain. The operations also include verifying a complete chain from the current node to a genesis node by repeating: identifying a node in the identity graph that has content that, using the query key to generate a hash result, has a hash result that matches the associated hash result of the current node, wherein failure to identify a node stops the repeating and wherein determining that the node is a genesis node stops the repeating, and making the node the current node, wherein the content of the node includes an associated hash result. The operations also include generating a response that indicates a successful verification request responsive to locating the genesis node and generating a response that indicates an unsuccessful verification request responsive to failing to locate the genesis node. In some implementations, the system is a remote device, such as a remote-controlled device.

According to one aspect, a method includes receiving at least a property identifying an entity and a query key, the query key being data originally selected by a purported keeper of the entity, and identifying a possible match for the property from graph access records, the possible match having an associated hash result, the possible match and associated hash result being considered a current node in a chain. The method also includes verifying a complete chain from the current node to a genesis node by repeating: identifying a node in a graph that has content that, using the query key to generate a hash result, has a hash result that matches the associated hash result of the current node, wherein failure to identify a node stops the repeating and determining that the node is a genesis node stops the repeating, and making the node the current node, wherein the content of the node includes an associated hash result. The method also includes generating a response that indicates a successful verification request responsive to locating the genesis node and generating a response that indicates an unsuccessful verification request responsive to failing to locate the genesis node.

These and other aspects can include one or more of the following features, alone or in combination. For example, the query key may be one of a phrase, an image, or a combination of data elements, the query key being selected by the purported keeper as part of an identity proofing process that initiated generation of the genesis node. As another example, the method may also include, for at least one node in the chain, obtaining a data item from the content and including the data item in the response that indicates a successful verification request. As another example, the method may also include including content of the genesis node in the response that indicates a successful verification request. In some implementations, the method may also include decrypting the content of the genesis node prior to including the content in the response. In some implementations, the content of the genesis node includes a two dimensional image or a three dimensional image of the entity. In such an implementation, the entity may be a person and the purported keeper is the person and the content of the genesis node is a biometric image or the entity may be an item and the purported keeper is a person.

As another example, subsequent to a successful verification request, the method may include generating a new node in the graph, the new node having content that includes data items from an activity that occurs subsequent to the successful verification request and the hash result associated with the possible match of the property used to locate the genesis node, generating a new hash result using the new node and the query key as input, and updating the hash result of the possible match of the property used to locate the genesis node to the new hash result. As another example, the entity may be a remote device in a network and the remote device may provide data with the property and the query key and the method may also include accepting the data responsive to a successful verification request and rejecting the data responsive to an unsuccessful verification request. As another example, the method may be performed by a remote-controlled device and instructions may be received with the property and the query key and the method may further include acting on the instructions responsive to a successful verification request and rejecting the instructions responsive to unsuccessful verification request. As another example, using the query key to generate the hash result can include adding the query key to the content of the node before generating the hash result and/or decrypting the content before generating the hash result.

According to one aspect, a method includes, responsive to a successful identity proofing process for an entity that includes at least one identity factor, receiving content for a genesis node in an identity chain, the content for the genesis node including genesis data capturing a unique physical property of the entity. The method also includes generating a genesis node in a graph, the genesis node having content that includes the genesis data, receiving a signature key from a keeper of the entity, the keeper having provided the at least one identity factor, generating a first hash result using as input the content of the genesis node and the signature key, generating a second node in the identity chain, the second node having content that includes identification of the at least one identity factor and the first hash result, generating a second hash result from using as input the content of the second node and the signature key, and storing a graph access record, the graph access record including the second hash result and at least one key property used to locate the entity in response to verification requests. Nodes in the graph and the graph access record may then be used in responding to verification requests.

These and other aspects can include one or more of the following features, alone or in combination. For example, the method may also include encrypting the genesis data before generating the genesis node, the genesis node storing the encrypted genesis data. As another example, the graph access record may be a node in the graph and/or an entry in a table. As another example, using the nodes in the graph and the graph access record to respond to a verification request can include receiving the verification request, which includes a query key and a key property, locating a first graph access record that matches the key property, and determining whether a chain to a genesis node exists using a hash result in the first graph access record and the query key. In some implementations, responsive to determining that a chain to a genesis node exists, the method may also include generating an activity node in the graph, the activity node including a hash result associated with the first graph access record and including data items relating to an activity for the entity, generating a third hash result by hashing the activity node and the query key, and replacing the hash result in the first graph access record with the third hash result. In some implementations, the graph access record is a first graph access record and the method may also include storing a second graph access record, the second graph access record including the second hash result and a key property that differs from the key property in the first graph access record. In some implementations, responsive to determining that a chain to a genesis node exists, the method may also include generating an activity node in the graph, the activity node including a hash result associated with the first graph access record and including data items relating to an activity for the entity, generating a third hash result by hashing the activity node and the query key, and adding a second graph access record, the second graph access record having the third hash result.

According to one aspect, a system includes at least one processor, an identity graph storing identity blocks, the identity blocks including genesis blocks, and memory storing instructions that, when executed by the at least one processor, cause the system to perform operations. The operations include receiving genesis data and a signature key after a successful identity proofing process for a person, the genesis data capturing a physical property of the person and the signature key being provided by the person, generating a first hash result using the genesis data as input, generating a genesis block in the identity graph, the genesis block having as content the genesis data, the content being encrypted using the signature key, generating a second hash result using as input payload data and the first hash result. The operations may also include generating an identity block in the identity graph, the identity block having as content the payload data and the first hash result, the content being encrypted using the signature key, generating a graph access record, the graph access record including the second hash result and at least one search property for the person, but lacking the signature key, and using the identity graph in responding to verification requests. In some implementations, the graph access record is a block stored in the identity graph. In some implementations, the operations can further include receiving, for the person, activity data, a query key, and a query property, determining whether a chain exists in the identity graph for the person using the query key and the query property, and responsive to determining the chain exists: generating a third hash result using as input the activity data and the second hash result, generating a new identity block in the identity graph, the new identity block having as content the activity data and the second hash result, wherein the content of the new identity block is encrypted using the query key, and updating the graph access record by replacing the second hash result with the third hash result.

According to one general aspect, a non-transitory computer-readable medium stores instructions that, when executed by at least one processor, cause a computing device to perform any of the operations or methods disclosed herein.

According to one general aspect, a system comprises at least one processor and a memory storing instructions that, when executed by the at least one processor, cause the computing system to perform any of the operations or methods disclosed herein.

What is claimed is:

1. A method comprising:
receiving at least a property identifying an entity and a query key, the query key being data originally selected by a purported keeper of the entity;
identifying a match for the property from graph access records, the match having an associated hash result, the match being considered a current node in a chain;
verifying a complete chain from the current node to a genesis node by repeating:
identifying a node in a graph that has content that when hashed using the query key results in a hash result that matches the associated hash result of the current node, wherein failure to identify a node stops the repeating and determining that the node is a genesis node stops the repeating, and
making the node the current node;
responsive to locating the genesis node, decrypting the content of the genesis node and generating a response that indicates a successful verification request and includes some decrypted content from the genesis node; and
responsive to failing to locate the genesis node, generating a response that indicates an unsuccessful verification request.

2. The method of claim 1, wherein the query key is one of a phrase, an image, or a combination of data elements, the query key being selected by the purported keeper as part of an identity proofing process that initiated generation of the genesis node.

3. The method of claim 1, further comprising:
for at least one node in the chain, obtaining a data item from the content; and
including the data item in the response that indicates a successful verification request.

4. The method of claim 1, wherein the property is a first property and the method further comprises:
receiving a second property that differs from the first property; and
storing, subsequent to a successful verification request, a new graph access record, the new graph access record including the associated hash result of the match and a key property that differs from the first property.

5. The method of claim 1, wherein the content of the genesis node includes a two dimensional image or a three dimensional image of the entity.

6. The method of claim 5, wherein the entity is a person and the purported keeper is the person and the content of the genesis node is a biometric image.

7. The method of claim 5, wherein the entity is an item and the purported keeper is a person.

8. The method of claim 1, further comprising, subsequent to a successful verification request:
   generating a new node in the graph, the new node having content that includes data items from an activity that occurs subsequent to the successful verification request and the hash result associated with the match of the property used to locate the genesis node;
   generating a new hash result using the new node and the query key as input; and
   updating the hash result of the match of the property used to locate the genesis node to the new hash result.

9. The method of claim 1, wherein the entity is a remote device in a network and the remote device provides data with the property and the query key and the method further comprises:
   accepting the data responsive to a successful verification request; and
   rejecting the data responsive to an unsuccessful verification request.

10. The method of claim 1, wherein the method is performed by a remote-controlled device and instructions are received with the property and the query key and the method further includes:
    acting on the instructions responsive to a successful verification request; and
    rejecting the instructions responsive to unsuccessful verification request.

11. The method of claim 1, wherein using the query key to generate the hash result includes adding the query key to the content of the node before generating the hash result.

12. The method of claim 1, wherein using the query key to generate the hash result includes decrypting the content before generating the hash result.

13. A system comprising:
    at least one processor coupled to a memory;
    a graph storing blocks, the blocks including genesis blocks; and
    memory storing instructions that, when executed by the at least one processor, cause the system to perform operations including:
      receiving at least a property identifying an entity and a query key, the query key being data originally selected by a purported keeper of the entity;
      identifying a match for the property from graph access records, the match having an associated hash result, the match being considered a current block in a chain;
      verifying a complete chain from the current block to a genesis block by repeating:
        identifying a block in the graph that has content that when hashed using the query key results in a hash result that matches the associated hash result of the current block, wherein failure to identify a block stops the repeating and wherein determining that the block is a genesis block stops the repeating, and
        making the block the current block;
      responsive to locating the genesis block, decrypting the content of the genesis block and generating a response that indicates a successful verification request and includes some decrypted content from the genesis block; and
      responsive to failing to locate the genesis block, generating a response that indicates an unsuccessful verification request.

14. The system of claim 13, wherein the graph access records are blocks in the graph.

15. The system of claim 13, wherein the graph access records are entries in a table.

16. The system of claim 13, wherein the query key is one of a phrase, an image, or a combination of data elements, the query key being selected by the purported keeper as part of an identity proofing process that initiated generation of the genesis block.

17. The system of claim 13, further comprising:
    for at least one block in the chain, obtaining a data item from the content; and
    including the data item in the response that indicates a successful verification request.

18. The system of claim 13, wherein the property is a first property and the memory stores instructions that, when executed by the at least one processor, cause the system to perform further operations including:
    receiving a second property that differs from the first property; and
    storing, subsequent to a successful verification request, a new graph access record, the new graph access record including the associated hash result of the match and a key property that differs from the first property.

19. The system of claim 13, wherein the content of the genesis block includes a two dimensional image or a three dimensional image of the entity.

20. The system of claim 13, wherein the entity is a person and the content of the genesis block includes biometric data for the person.

21. The system of claim 13, further comprising, subsequent to a successful verification request:
    generating a new block in the graph, the new block having content that includes data items from an activity that occurs subsequent to the successful verification request and the associated hash result from the match;
    generating a new hash result using the new block and the query key as input; and
    updating the associated hash result of the match to the new hash result.

22. The system of claim 13, wherein the entity is a remote device in a network and the remote device provides data with the property and the query key and the memory stores instructions that, when executed by the at least one processor, cause the system to perform further operations including:
    accepting the data responsive to a successful verification request; and
    rejecting the data responsive to an unsuccessful verification request.

23. The system of claim 13, wherein the system includes a remote-controlled device and instructions are received with the property and the query key and the memory stores instructions that, when executed by the at least one processor, cause the remote-controlled device to perform operations including:
    acting on the instructions responsive to a successful verification request; and
    rejecting the instructions responsive to unsuccessful verification request.

* * * * *